(12) United States Patent
Bentley et al.

(10) Patent No.: US 8,751,526 B1
(45) Date of Patent: Jun. 10, 2014

(54) EFFICIENT RANGE UNIONS IN SQL

(75) Inventors: Keith A. Bentley, Elverson, PA (US);
Raymond B. Bentley, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 13/598,053

(22) Filed: Aug. 29, 2012

(51) Int. Cl.
*G06F 17/30* (2006.01)

(52) U.S. Cl.
USPC .......................................... 707/769; 707/743

(58) Field of Classification Search
None
See application file for complete search history.

(56) References Cited

U.S. PATENT DOCUMENTS

| | | | |
|---|---|---|---|
| 5,574,835 A * | 11/1996 | Duluk et al. | ................... 345/421 |
| 5,963,956 A | 10/1999 | Smartt | |
| 7,409,385 B2 | 8/2008 | Lindsay et al. | |
| 7,539,667 B2 | 5/2009 | Lindsay et al. | |
| 2003/0154189 A1 | 8/2003 | Egilsson et al. | |
| 2006/0155679 A1* | 7/2006 | Kothuri et al. | ..................... 707/3 |
| 2011/0196602 A1* | 8/2011 | Pfeifle et al. | .................. 701/200 |
| 2011/0302194 A1 | 12/2011 | Gonzalez et al. | |
| 2012/0136575 A1* | 5/2012 | Samet et al. | .................. 701/540 |

* cited by examiner

*Primary Examiner* — Tony Mahmoudi
*Assistant Examiner* — Uman Mian
(74) *Attorney, Agent, or Firm* — Cesari and McKenna, LLP

(57) ABSTRACT

In one embodiment, a union of the bounding boxes is computed of entities in a relational database indexed by a spatial index, filtered according to some criteria. For each of a set of targets to be considered, a bounding box of the target is tested against a current range union result. If the bounding box is completely contained in the current range union result, the target is excluded from further consideration. Otherwise, the target is processed. When the target is an entity, it is determined whether the entity meets the entity filtering criteria. If so a union is computed and the current range union result updated. When each of the targets to be considered in the spatial index has been subject to test or excluded, the current range union result is returned as a final range union result.

19 Claims, 11 Drawing Sheets

| ENTITYID | XMIN | XMAX | YMIN | YMAX | PROP1 |
|---|---|---|---|---|---|
| e1 | 1 | 3 | 9 | 10 | 1 |
| e2 | 1.4 | 3 | 5 | 6.5 | 1 |
| e3 | 10.5 | 11.8 | 3 | 4 | 2 |
| e4 | 6.9 | 8 | 6 | 7 | 9 |
| e5 | 7 | 9.5 | 5 | 8.2 | 2 |
| e6 | 10 | 12 | 6.5 | 8.3 | 7 |
| e7 | 9 | 10 | 9.5 | 11 | 2 |
| e8 | 11.5 | 15 | 4.3 | 8 | 6 |
| e9 | 3.8 | 5.5 | 5 | 7 | 2 |
| e10 | 4.2 | 6 | 3.5 | 4.1 | 3 |
| e11 | 2 | 4 | 3.2 | 4.1 | 3 |

| STEP | TARGET | OUTCOME OF SPATIAL SCORE | PROP1<4 | CURRENT RANGE UNION RESULT FROM ENTITY ACCEPT |
|---|---|---|---|---|
| 1 | ROOT | ACCEPT | | |
| 2 | A | ACCEPT | | |
| 3 | A1 | ACCEPT | | |
| 4 | e1 | ACCEPT | ACCEPT | {1,3,9,10} |
| 5 | A2 | ACCEPT | | |
| 6 | e9 | ACCEPT | ACCEPT | {1,5.5,5,10} |
| 7 | e2 | REJECT | | |
| 8 | B | ACCEPT | | |
| 9 | B1 | ACCEPT | | |
| 10 | e6 | ACCEPT | REJECT | |
| 11 | e7 | ACCEPT | ACCEPT | {1,10,5,11} |
| 12 | B2 | ACCEPT | | |
| 13 | e3 | ACCEPT | ACCEPT | {1,11.8,3,11} |
| 14 | e8 | ACCEPT | REJECT | |
| 15 | B3 | REJECT | | |
| 16 | C | REJECT | | |

FIG. 9

EFFICIENT RANGE UNIONS IN SQL

BACKGROUND

1. Technical Field

The present disclosure relates generally to manipulation of spatial data in relational databases, and more specifically to efficiently determining a union of the bounding boxes of entities, filtered according to an entity filtering criteria in SQL.

2. Background Information

Relational databases are electronic databases that store related data in tables of rows and columns, and allow links to be established between tables that have matching fields, such that multiple tables may be simultaneously queried. Many relational databases utilize a version of the SQL language, a special-purpose programming language adapted to managing data. SQL code may be implemented by a relational database system that executes as a separate process and is accessed by a client application. For example, SQL code may be executed by a MySQL® database system available open source, an Oracle Database available from Oracle Corp, or a Microsoft SQL Server database system available from Microsoft Corp. Alternatively, SQL code may be implemented by a relational database system implemented by a self-contained programming library that may be integrated within the client application itself. For example, SQL code may be executed by the SQLite® embedded SQL database system, available in the public domain.

Among other uses, relational databases may be utilized to store spatial data that describes the position, shape and orientation of entities in multi-dimensional space. The position, shape and orientation of entities are typically represented using a spatial reference system. Among other functions, the spatial reference system provides a coordinate system (e.g., a Cartesian coordinate system) through which spatial information may be defined. For example, the position of an entity may be defined by x-axis, y-axis, and z-axis coordinates.

Spatial data stored in a relational database is typically indexed using a spatial index that is designed to speed spatial queries. Often, the spatial index is structured as an R-tree. An R-tree is a type of balanced tree data structure that is premised upon the use of bounding boxes. Bounding boxes are regions of multi-dimensional space that span from a minimum to a maximum extent of a related entity or group of entities. Typically, bounding boxes are aligned with the axis of the coordinate system being employed, and are therefore referred to as axis-aligned bounding boxes (AABBs). For example, in 2-D spatial data, the bounding box of a particular entity may be a rectangle that spans from the entity's minimum x-axis coordinate to its maximum x-axis coordinate, and from its minimum y-axis coordinate to its maximum y-axis coordinate. In the case of 3-D spatial data, the bounding box of a particular entity may be a rectangular prism that spans from the entity's minimum x-axis coordinate to its maximum x-axis coordinate, from its minimum y-axis coordinate to its maximum y-axis coordinate, and from its minimum z-axis coordinate to its maximum z-axis coordinate.

An R-tree at its lowest level has leaf nodes that include one or more individual entities. If the leaf node includes a single entity, the bounding box of the leaf node is simply the bounding box of the individual entity itself. If the leaf node includes multiple entities, the bounding box of the leaf node is a minimum sized box that encloses all the bounding boxes of the individual entities included in the leaf node. At higher levels, an R-tree includes internal nodes that represent groups of leaf nodes or other internal nodes. The bounding box of each internal node is a minimum sized box that encloses all the bounding boxes of the group. At the very highest level of an R-tree is a root node. The bounding box of the root node is a minimum sized box that encloses all the bounding boxes of all the entities indexed by the R-tree.

Search using an R-tree generally begin at the root node, and progress downward through the levels of the tree. For example, if a user desires to find entities located within a region of interest (i.e., a query box), a search query is initiated based on the query box. At the root node, a determination is made which lower-level internal nodes have bounding boxes that overlap the query box. The search then proceeds to these lower-level internal nodes, where it is determined which still-lower-level internal nodes have bounding boxes that overlap the query box. The process continues down the R-tree, through as many levels as may be present, until leaf nodes are eventually encountered. The bounding boxes of the individual entities included in the encountered leaf nodes are tested against the query box, and the corresponding entities are placed into a result set for the search query if their bounding box overlaps the query box.

In addition to simple search queries, a variety of other types of operations may be performed using a spatial index in connection with a relational database including spatial data. For example, it is sometimes desirable to compute the union of the bounding boxes (i.e., a range union) of a set of entities, where the union is filtered according to some entity filtering criteria. Such a range union may indicate the general extent of space occupied by entities that have a desired property.

While it is possible to compute a range union filtered by a criteria using the existing operators provided in many relational database systems (e.g., SQL database systems), typically such computations are quite inefficient. A "brute-force" approach is generally relied upon. In a typical "brute-force" approach, every entity is compared against the entity filtering criteria, and once entities that meet the entity filtering criteria are found, a union of their bounding boxes is performed. For instance, to compute the range union of 3-D spatial data having x-axis, y-axis and z-axis coordinates, the following SQL select statement may be executed:

SELECT min(minx), max(maxx), min(miny), min(maxy), min(minz), max(maxz) FROM EntityTable WHERE <additional WHERE clause> where "SELECT" is a SQL clause that determines which columns to include in the query's result set, "FROM" is a SQL clause that identifies the table from which to draw data from, "WHERE" is a SQL clause that filters out unwanted data according to indicated filtering criteria, "min( )" and "max( )" are SQL functions which return, respectively, the smallest and largest value of a selected column, "minx", "maxx", "miny", "maxy", "minz" and "maxz" are column names, and "EntityTable" is a table name of the table that includes the spatial data.

Even if reliable indexes are available for the entity filtering criteria, the above SQL select statement is highly inefficient, as it causes every entity that meets the entity filtering criteria to be processed, even though very few generally can contribute to the final result. Valuable processing time may be wasted processing entities that will not actually change the range union result. While these inefficiencies may be tolerated when relational database systems are run on high-speed servers, which have plentiful computing resources, or when the relational databases are relatively small, they may be unacceptable when relational database systems are executed on devices that have more limited computing resources, such as portable electronic devices (e.g., tablet computers), and/or when the relational databases are quite large. Latencies introduced by the inefficiency may impair operation of the client application utilizing the relational database system.

Accordingly, there is a need for improved techniques that address these and other shortcomings when performing a union of the bounding boxes (i.e., a range union) of a set of entities in a relational database indexed by a spatial index, where the union is filtered according to some entity filtering criteria.

SUMMARY

In one embodiment, a union of the bounding boxes (i.e., a range union) of entities in a relational database indexed by a spatial index, filtered according to some entity filtering criteria, is efficiently computed by a technique that avoids testing the entity filtering criteria against entities in the spatial index that cannot contribute to a range union result.

In response to a query statement requesting a range union filtered according to entity filtering criteria, a backchannel object is created to maintain a current range union result and an indication of a most recent bounding box tested. For each target (e.g., node and entities) to be considered in a spatial index (e.g., an R-tree), the bounding box of the target is tested against the current range union result. If the bounding box of the target subject to test is completely contained in the current range union result, the target subject to test cannot contribute to a final range union result, and is excluded from further consideration. If the target is a node, the node and any lower level nodes pointed to from it, and any entities included in the node or lower level nodes, may also be excluded from further consideration. If the bounding box of the target subject to test is not completely contained in the current range union result, the bounding box is saved in the indication of the most recent bounding box tested. If the target is an entity, the entity filtering criteria are tested against properties of the entity. If the entity meets the entity filtering criteria, the entity is considered acceptable. In response, a union is computed of the entity's bounding box saved in the indication of the most recent bounding box tested with the current range union result. The current range union result is updated to store this union.

After all the targets to be considered in the spatial index have been subject to the spatial testing or excluded from consideration, the current range union result is returned as a final range union result. In such manner, a range union filtered according to the entity filtering criteria may be computed absent the need for comparison of every entity against the entity filtering criteria.

BRIEF DESCRIPTION OF THE DRAWINGS

The description below refers to the accompanying drawings of example embodiments, of which:

FIG. 9 is a tabular representation of example operational steps performed, using the example data and R-tree described in FIGS. 4-8B.

DETAILED DESCRIPTION

Figure 1:
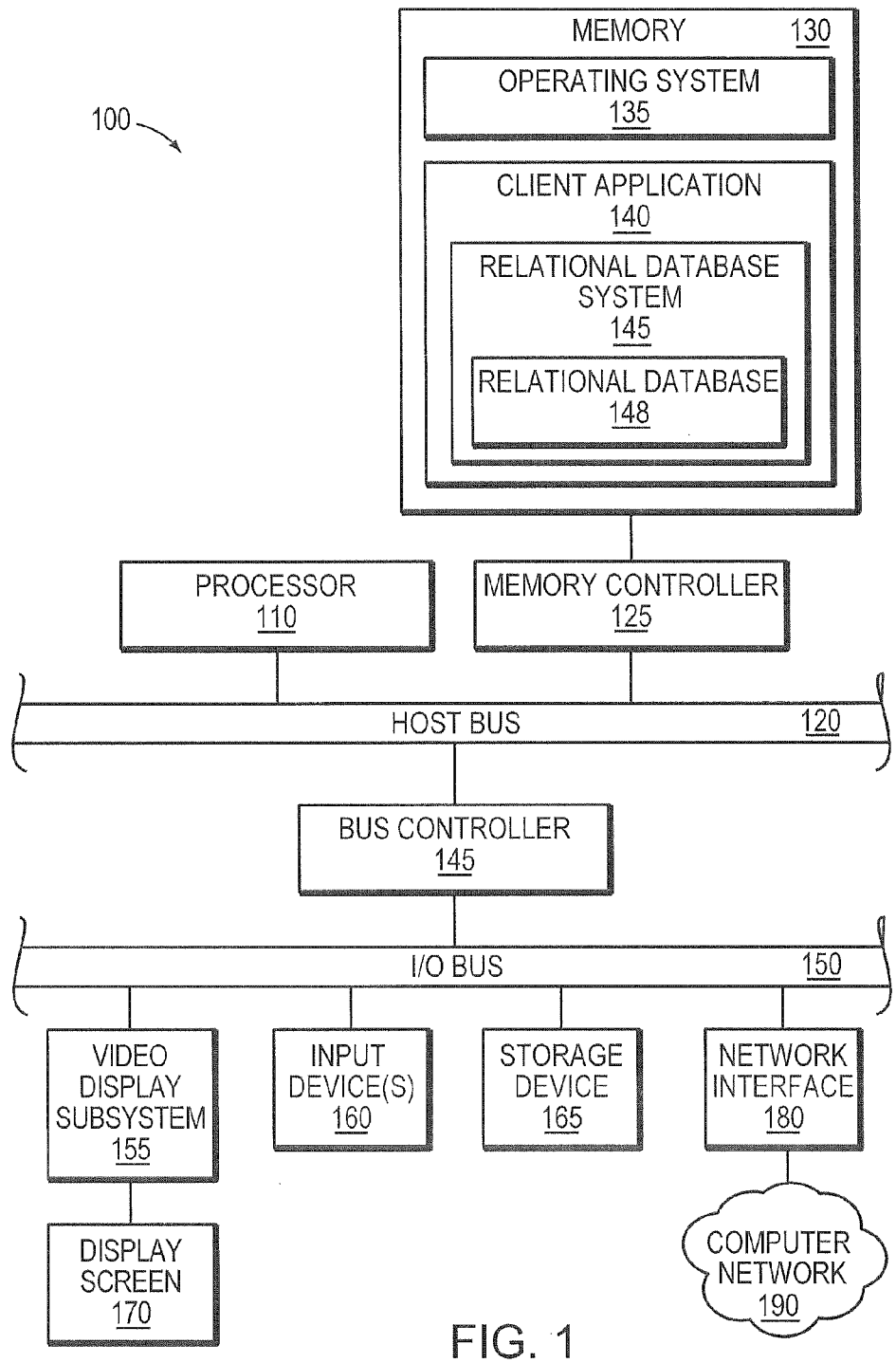
FIG. 1 is a block diagram of an example electronic device in which at least some of the presently described techniques may be employed.

FIG. 1 is a block diagram of an example electronic device 100 in which at least some of the presently described techniques may be employed. The electronic device may be a designed for stationary operation (e.g., may be a desktop computer), or may be portable electronic device (e.g., a table computer, a notebook computer, a smartphone, a personal digital assistant (PDA), etc.) designed to be readily transported by a user and utilized from a variety of different locations. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is configured to store at least a portion of computer-executable instructions and data for an operating system (OS) 135 while the electronic device 100 is operating. In addition, the memory 130 may store at least portions of a client application 140 and a relational database system 145. The client application 140 may be, for example, a computer aided design (CAD) viewing application that includes functionality and tools to, among other things, visualize a model of structure (e.g., a building) or other object. The relational database system 145 may be a self-contained programming library integrated into the client application 140, for example a SQLite® embedded SQL database system. Alternatively, the relational database system 145 may exist as a separate process or application, or as a connection to another server computer (not shown) that is accessed by a client application. The relational database system 145 maintains a relational database 148 that includes spatial data (e.g., 3-D spatial data) concerning entities. In this context, an "entity" refers to a physical or virtual form that both occupies some portion of multi-dimensional space, and has at least some properties which define its characteristics. Where the client application 140 is a CAD viewing application, an entity may represent an element in a 3-D model of a structure (e.g., a building) or other object, which has position, shape and orientation within 3-D space, and properties such as price, weight, vendor, completion status, etc. The spatial data in the relational database may define each entity in the 3-D model in reference to a coordinate system (e.g., a Cartesian coordinate system). For example, the position of a particular point of an element in a 3-D model may be defined by an x-axis, a y-axis, and a z-axis coordinates.

The host bus 120 of the electronic device 100 is coupled to an input/output (I/O) bus 150 through a bus controller 145. A video display subsystem 155 may include a display screen 170 and hardware to drive the display screen. The video display subsystem 155 is coupled to the I/O bus 150. The display screen 170, among other functions, may show a user interface of the client application 140, as well as other user-interfaces. One or more input devices 160, such as a keyboard, touch sensor, touchpad, mouse, etc., are provided and used for interaction with the electronic device 100, and applications, such as the client application 140, executing on the electronic device. A persistent storage device 165, such as a hard disk drive, a solid-state drive, or other type or persistent data store, is coupled to the I/O bus 150, and may persistently store computer-executable instructions and data, that are available to be loaded to the volatile memory 130 when needed. For example, computer-executable instructions and data for the operating system 135, the client application 140, and the relational database system 145 may be stored in the persistent storage device 165. Similarly data, including the spatial data of the relational database 148, may be stored in the persistent storage device 165 until needed. The I/O bus 150 may further be coupled to a network interface 180 that interfaces with a computer network 190, such as the Internet. The computer network 190 may allow communication between the electronic device 100 and other devices, using any of a number of well known networking protocols, including wireless networking protocols. Such communication may enable a number of collaborative, distributed, and remote computing arrangements.

Figure 2:
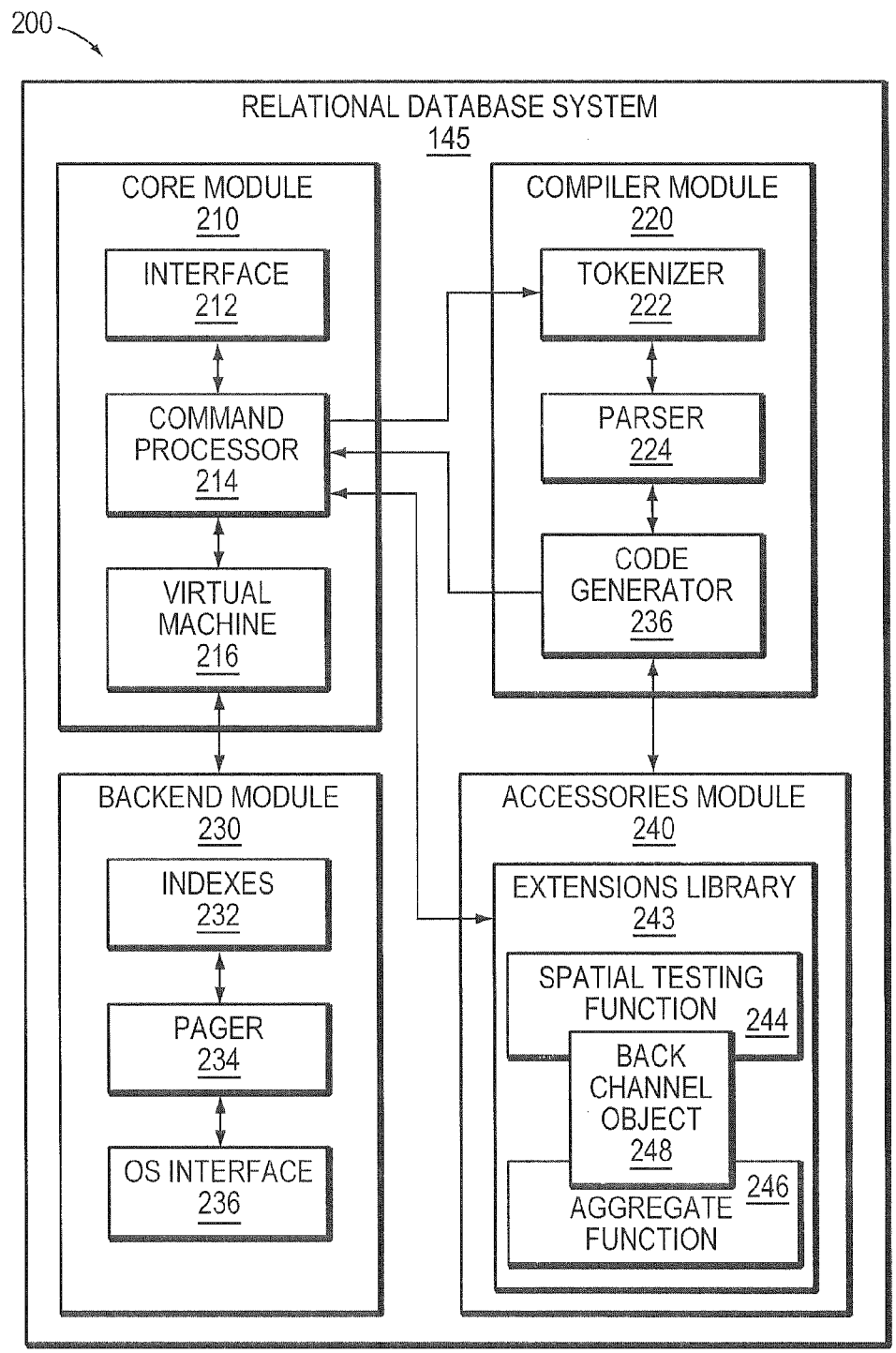
FIG. 2 is a block diagram of an example software architecture of an example relational database system.

FIG. 2 is a block diagram of an example software architecture 200 of the relational database system 145. The example software architecture may represent the architecture of a SQLite® embedded database system, or the architecture of another relational database system, that may or may not utilize the SQL language. The relational database system 145 may include a number of primary functional modules, such as a core module 210, a compiler module 220, a backend module 230 and an accessories module 240. The core module 210 includes an interface 212 for receiving strings of statements (e.g., SQL statements) to be executed, for example, from the client application 140. The core module 210 also includes a command processor 214 that operates upon those statements. Among other operations, the command processor 214 may pass strings to a tokenizer 222 of the is compiler module 220. The tokenizer 222 breaks up the original string into tokens, and passes those tokens, for example, one-by-one, to a parser 224. The parser 224 assigns meaning to the tokens based on their context, and assembles them into complete statements. After the parser 224 assembles the tokens into complete statements, it may call a code generator 226 of the compiler module 220. The code generator 226 produces virtual machine code that will perform the tasks that the statements requested. The virtual machine code is returned to the command processor 214 and is executed by a virtual machine 216 of the core module 210. The virtual machine 216 implements an abstract computing engine adapted to manipulate relational database data.

The relational database data is generally organized according to one or more indexes 232. Where the data includes spatial data, it may be indexed by a spatial index (e.g., an R-tree) that is designed to speed spatial queries. A pager 234 may be used to retrieve data related to nodes of an index from a storage device. Data may be accessed in fixed size chunks, and the pager 234 may be responsible for reading, writing and caching these chunks. To perform its functions, the pager 234 may interact with an OS interface 236 that provides an abstraction layer for communicating with the OS 135 of the electronic device 100.

An accessories module 240 may include additional functionality that supports and/or extends the other functional modules 210, 220, 230 of the relational database system 145. Among other things, the accessories module 240 may include an extensions library 242 that includes user-supplied extension functions that supplement the core functions and operators of the relational database system 145 (e.g., provided in the SQL language). Through use of the extensions library 242, a user may add new functions or redefine the behavior of existing functions. The extensions library 242 may include a new spatial testing function 244 (referred to herein by the name "SpatialScore") and a new aggregate function 246 (referred to herein by the name "EntityAccept"). The spatial testing function 244 and aggregate function 246 may communicate with one another, and potentially other functions, using a backchannel object 248. The backchannel object 248 may be a global variable, a local address of an object forwarded via context arguments, or other mechanism that allows the exchange of values between functions.

As discussed above, it may be desirable to compute the union of the bounding boxes (e.g., AABBs) of spatial data stored in a relational database indexed by a spatial index (e.g., an R-tree), where the union is filtered according to an entity filtering criteria. Such a range union filtered according to an entity filtering criteria may serve a number of purposes. For example, where the client application 140 is a CAD viewing application that includes functionality to visualize a model, and the entities in the relational database 148 represent elements of the model, the range union filtered according to filtering criteria may indicate the extent of space in which elements of the model that have certain properties are found. This information may be useful in placing a virtual camera to produce views that encompass all such elements of the model. A range union filtered according to entity filtering criteria may also serve a number of other purposes, in connection with CAD viewing applications, or other types of client applications.

According to one embodiment of the present disclosure, the spatial testing function ("SpatialScore") 244, aggregate function ("EntityAccpet") 246 and the backchannel object 248 are used to efficiently perform range unions filtered according to an entity filtering criteria. In response to a query statement (e.g., a SQL SELECT statement) requesting a range union filtered according to an entity filtering criteria (e.g., SQL WHERE criteria), the command processor 214 receives a backchannel object 248. The backchannel object 248 maintains at least two quantities: a current range union result, and an indication of a most recent bounding box tested. The current range union result may be initialized to NULL. The command processor 214 calls the spatial testing function ("SpatialScore") 244 for each of a set of targets (e.g. nodes and entities) in the spatial index (e.g., R-tree) under consideration. Such a call may be triggered in response to an operator (e.g., a SQLite® MATCH operator) that indicates a function should be applied to each node of the spatial index. At each of the targets (e.g., nodes and entities) under consideration, the spatial testing function 244 tests the bounding box (e.g., AABB) of the target against the current range union maintained in the backchannel object 248. For the first target being tested, the spatial testing function 244 would test the bounding box of the target against NULL or some other indication that the current range union in the backchannel object is not yet valid, while subsequently the current range union result maintained in the backchannel object 248 would typically have an actual value.

If the bounding box of the target subject to test is completely contained in the current range union result maintained in the backchannel object 248, it is known that the target subject to test cannot contribute to the final range union result. If the target is a node, the node and any lower level nodes pointed to from it, and any entities included in the node or lower level nodes, cannot contribute to the final range union result. Accordingly, the target subject to test is excluded from further consideration. Further, if the target is a node, the node and any lower level nodes pointed to from it, and any entities included in the node or lower level nodes may be excluded from further consideration.

If the bounding box of the target subject to test is not completely contained in the current range union result maintained in the backchannel object 248, at least one entity associated with the target may potentially contribute to the final range union result. The bounding box is saved in the indication of most recent bounding box tested in the backchannel object 248. Further if the target is an entity, the command processor 214 causes the entity filtering criteria (e.g., the SQL WHERE criteria) to be tested against properties of the entity. If the entity meets the entity filtering criteria (e.g., the SQL WHERE criteria), the entity is considered acceptable. In response, the aggregate function ("EntityAccept") 246 is called, which computes a union of the indication of most recent bounding box tested with the current range union result maintained in the backchannel object. The current range union result is updated to be this computed union. If the entity does not meet the filtering criteria (e.g., the SQL WHERE criteria), the aggregate function ("EntityAccept") 246 is not called by the command processor 214 and the indication of most recent bounding box tested is not used.

After all the targets in the spatial index (e.g. R-tree) have been subject to the spatial test function 244 or excluded from consideration, and the current range union result maintained in the backchannel object updated for acceptable entities, the current range union result maintained in the backchannel object is returned as the final range union result. In such manner, the range union filtered according to filtering criteria may be computed absent the need for comparison of every entity against the entity filtering criteria.

In an SQL implementation the above discussed technique may be initiated by the following SQL statement:

SELECT EntityAccept (a.EntityId) FROM SpatialIdx AS a, EntityTable AS b WHERE a.EntityId MATCH SpatialScore(1) AND <additional WHERE criteria from b> where "SELECT" is a SQL clause that determines which columns to include in the query's result set, "FROM" is a SQL clause that identifies the table from which to draw data, "WHERE" is a SQL clause that filters out unwanted data according to indicated filtering criteria, "MATCH" is a SQLite® operator that indicates a function should be applied to each node of an index, "AS" is a SQL clause that temporarily assigns an alias, "a" and "b" are temporarily assigned aliases, "AND" is a SQL operator that perfumes a logical and operation, "EntityTable" is a table name of the table that includes the entity data, "SpatialIdx" is the spatial index of the entity table, and "EntityId" returns an identifier of an entity. It should be understood, that in other implementations, which may or may not utilize SQL, the form of the statement may differ. Such alternative statements may be structured according to a variety of language specific formats and conventions.

Figure 3A:
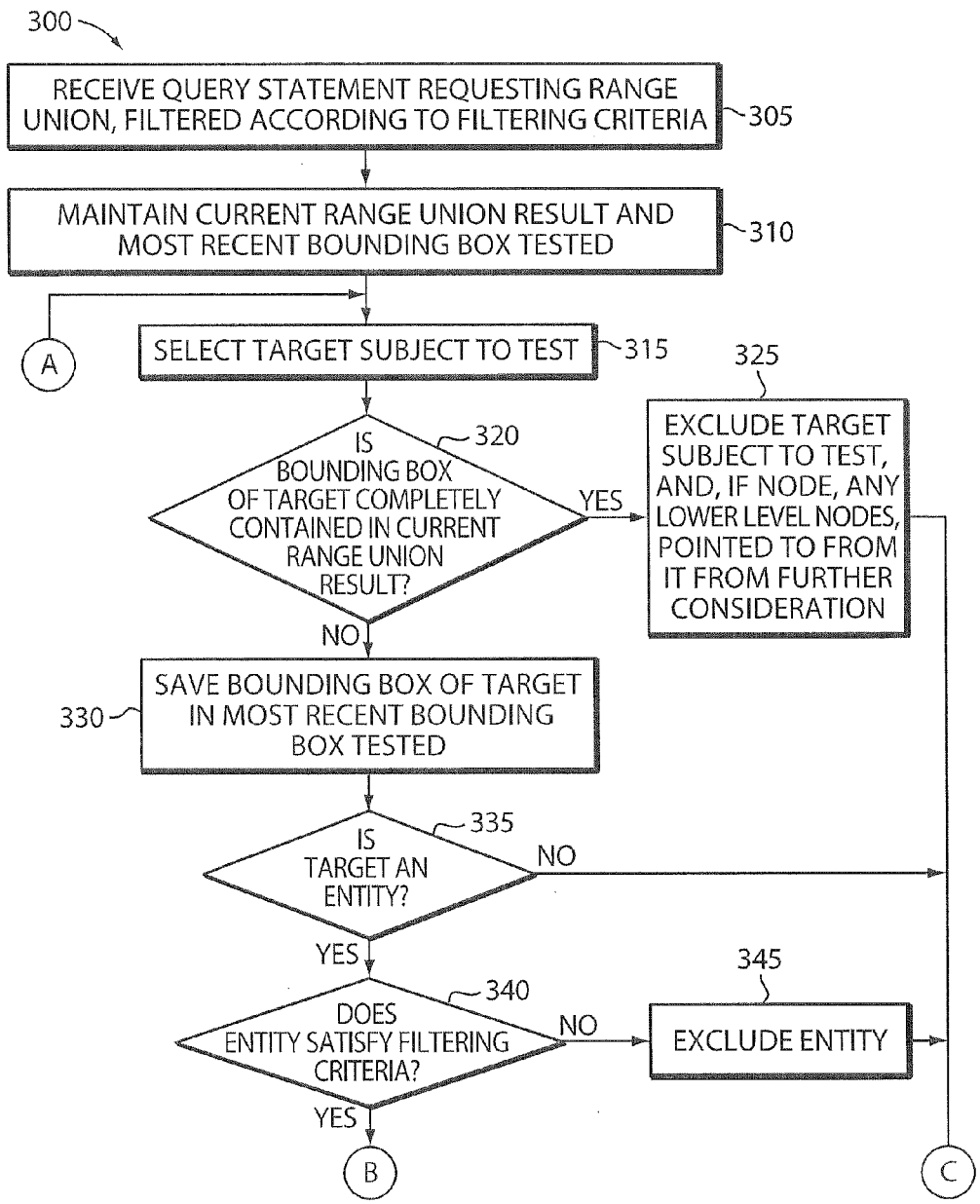
FIGS. 3A and 3B, together, are a flow diagram of example operations for efficiently computing a range union filtered according to entity filtering criteria.
Figure 3B:
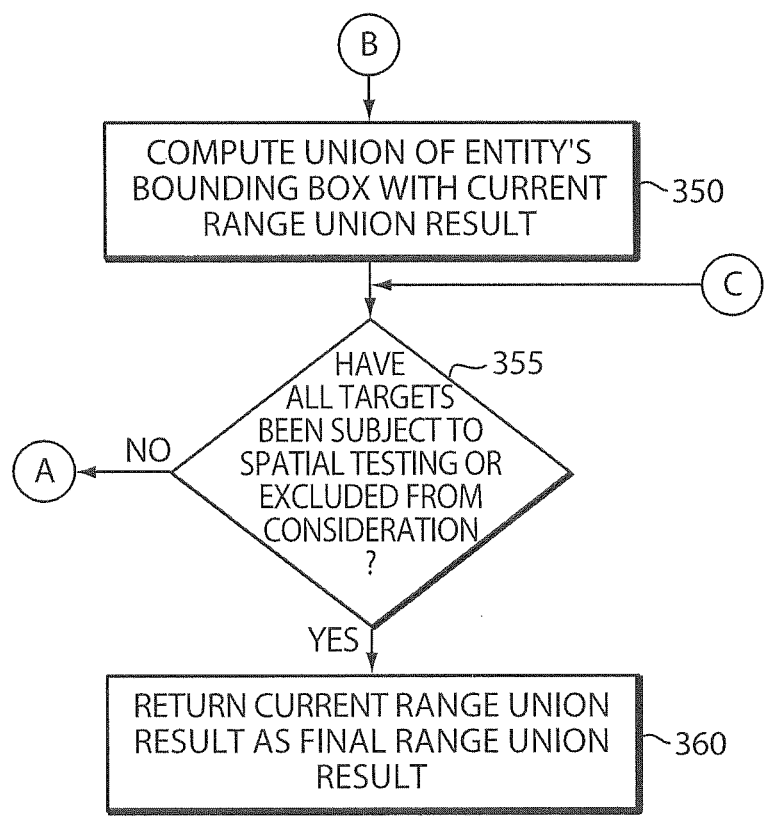

FIGS. 3A and 3B, together, are a flow diagram 300 of example operations for efficiently computing a range union filtered according to entity filtering criteria. At step 305, a query statement is received requesting a range union filtered according to entity filtering criteria. At step 310, a current range union result and an indication of a most recent bounding box tested are maintained. At step 315, a target (e.g., node or entity) in the spatial index (e.g., R-tree) is selected to be subject to test.

At step 320, the bounding box of the target subject to test is tested against the current range union result. If the bounding box of the target subject to test is completely contained in the current range union result, execution proceeds to step 325, where the target subject to test is excluded from further consideration. If the target is a node, the node and any lower level nodes pointed to from it, and any entities included in the node or lower level nodes, may also be excluded from further consideration. If the bounding box of the target subject to test is not completely contained in the current range union result, execution proceeds to step 330.

At step 330, the bounding box of the target subject to test is saved in the indication of the most recent bounding box tested. At step 335 it is determined if the target is an entity. If the target is not an entity (e.g., is a node) execution proceed to step 355. If the target is an entity, execution proceeds to step 340, where the entity filtering criteria are tested against properties of the entity. If the entity does not satisfy the entity filtering criteria, execution proceeds to step 345, where the entity is excluded. If the entity satisfies the entity filtering criteria, execution proceeds to step 350, where a union is computed of the entity's bounding box with the current range union result. The current range union result is updated to store this union. Execution then proceeds to step 355.

At step 355, a determination is made if all the targets (e.g., nodes and entities) in the spatial index have been subject to spatial testing or excluded from consideration. If not, execution loops back to step 315, where another target is selected. If so, execution proceeds to step 360 where the current range union result is returned as a final range union result, and the process terminates.

The techniques described above may be illustrated by application to specific example data. For clarity of illustration, the example data described below includes 2-D spatial data, however it should be understood that the techniques may be readily applied to other multi-dimensional spatial data (e.g., 3-D spatial data).

Figure 4:
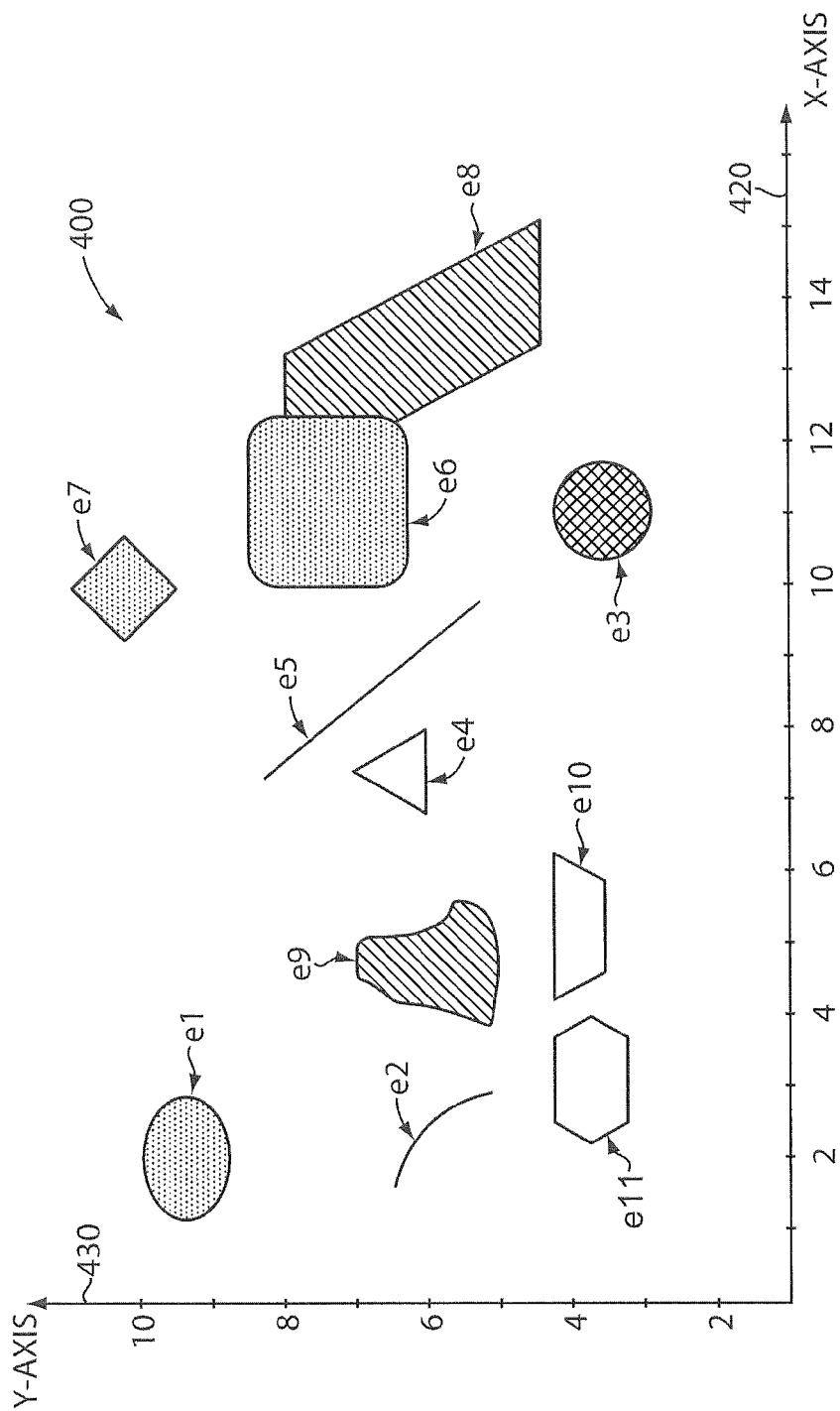
FIG. 4 is a graphical representation of example entities to which the technique described herein may be applied.

FIG. 4 is graphical representation 400 of example entities e1-e11 to which the technique may be applied. The position, space and orientation of the example entities are defined by reference to a Cartesian coordinate system, through the use of x-axis 420 and y-axis 430 coordinates.

Figure 5:
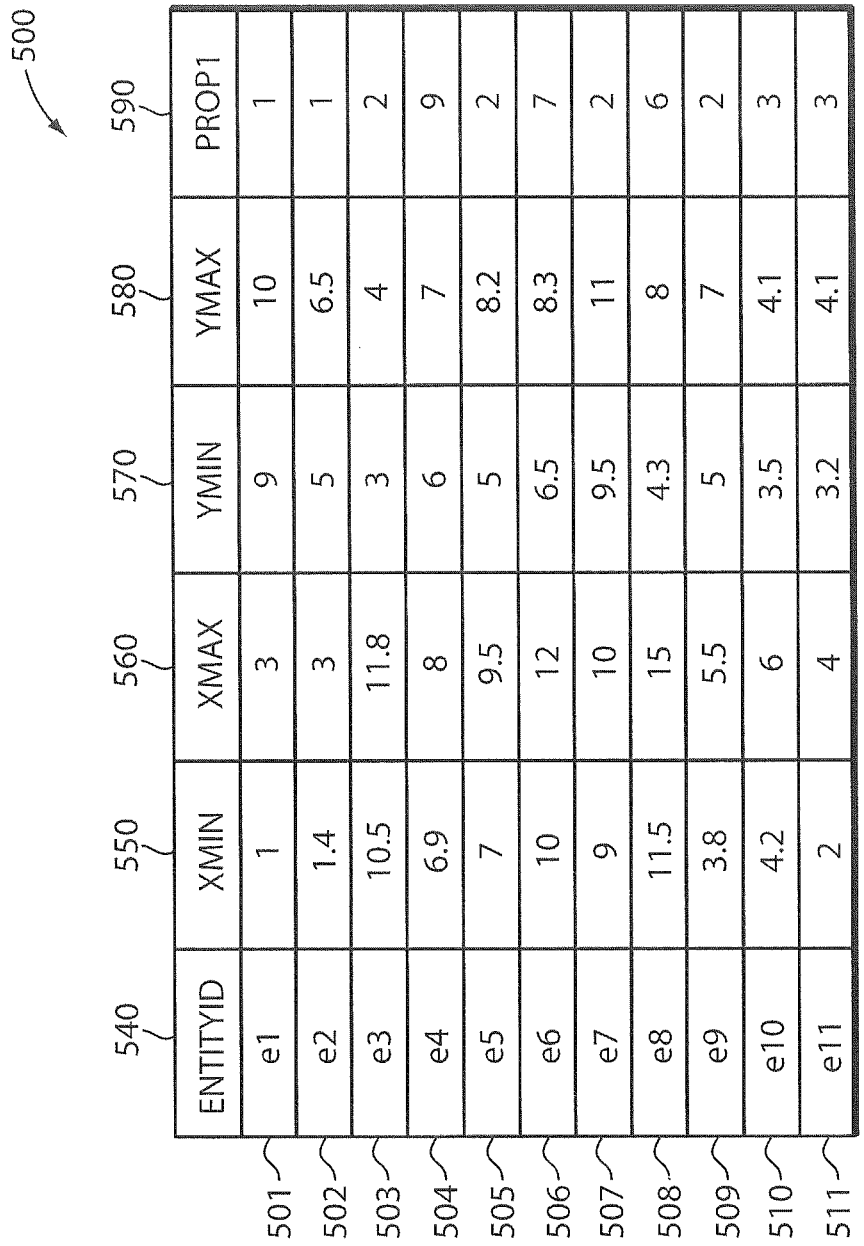
FIG. 5 is an example table that stores data concerning the example entities of FIG. 4.

FIG. 5 is an example table 500 that stores data concerning the example entities e1-e11 of FIG. 4. Each entity corresponds to a respective row 501-511. A first column indicates an entity identifier ("EntityID") that uniquely identifies each entity and may serve as a primary key. The next four columns 550-580 include 2-D spatial data that indicates the minimum x-axis coordinate ("xmin"), the maximum x-axis coordinate ("xmax"), the minimum y-axis coordinate ("ymin") and the maximum y-axis coordinate ("ymax") of each entity. The final column 590 includes non-spatial data, descriptive of a generic property ("Prop1") of each entity.

Figure 6:
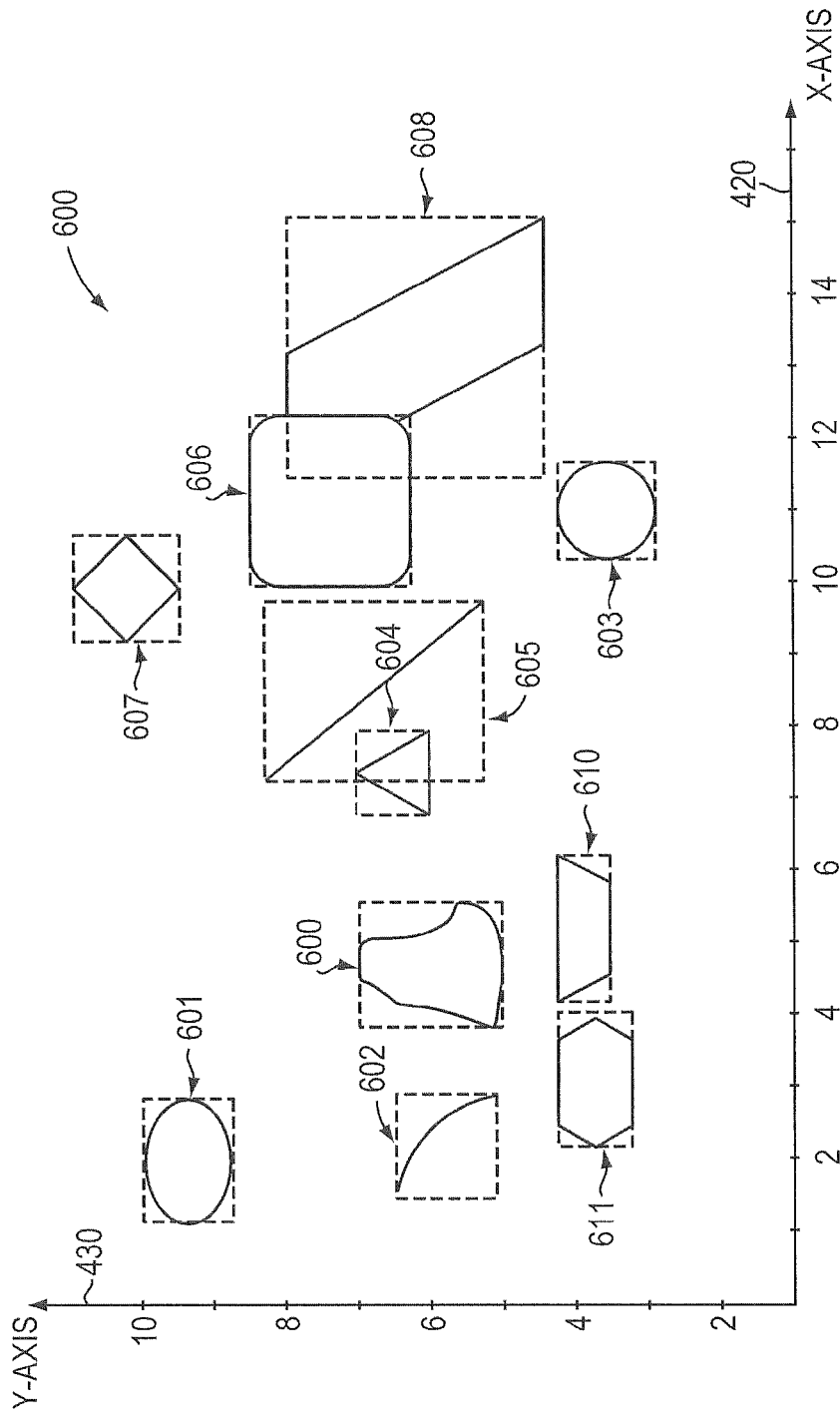
FIG. 6 is a graphical representation of example bounding boxes of the example entities of FIGS. 4 and 5.

FIG. 6 is a graphical representation 600 of example bounding boxes 601-611 of the example entities e1-e11 of FIGS. 4 and 5. Each bounding box is a rectangle that spans from the minimum x-axis coordinate to the maximum x-axis coordinate, and from the minimum y-axis coordinate to the maximum y-axis coordinate of the respective entity. In this example, the bounding boxes are aligned with the x-axis 420 and the y-axis 430, and accordingly are AABBs.

Figure 7:
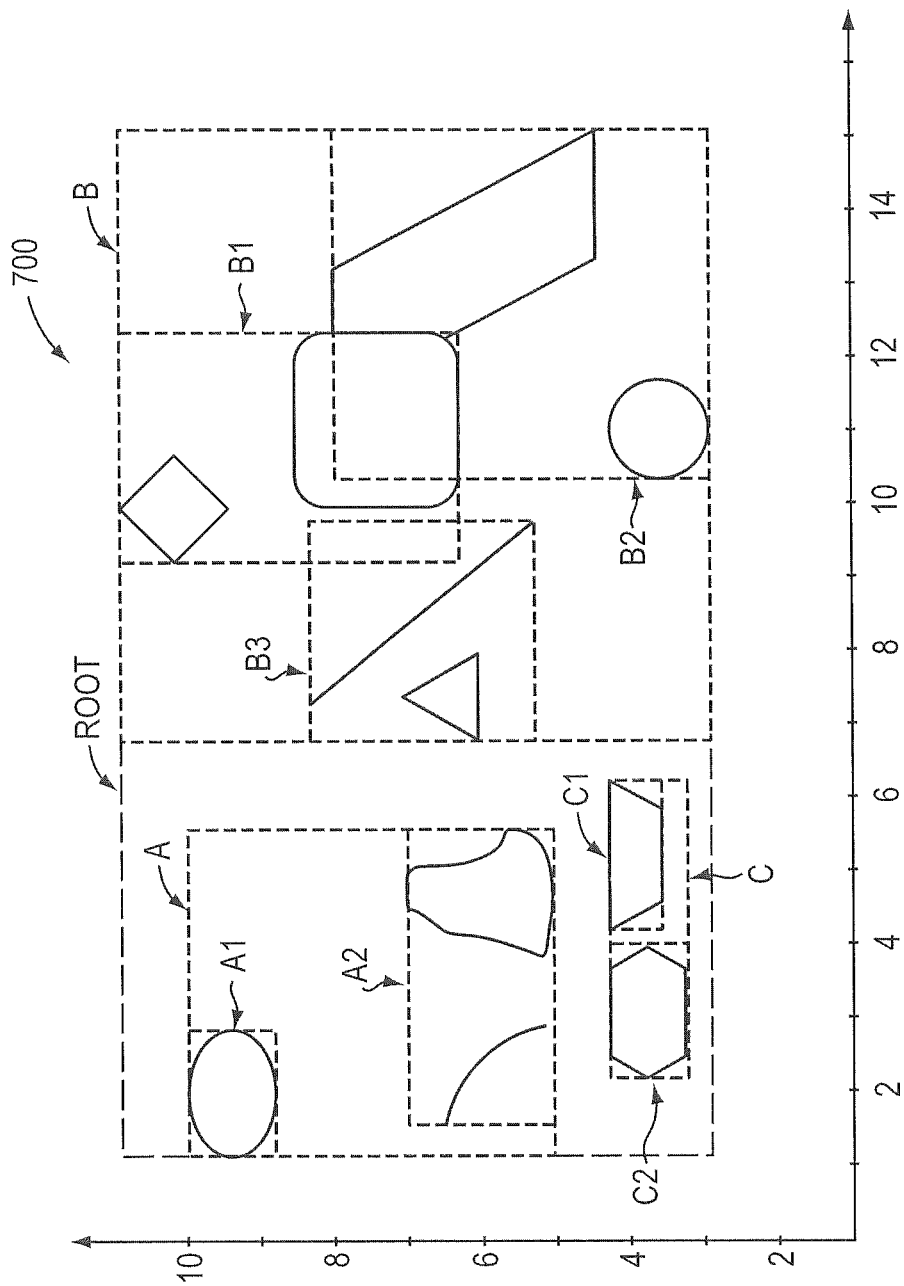
FIG. 7 is a graphical representation of an example spatial index, more specifically an R-tree, which may be used to speed spatial queries.

FIG. 7 is a graphical representation 700 of an example spatial index, more specifically an R-tree, which may be used to speed spatial queries. The R-tree includes leaf nodes A1, A2, B1, B2, B3, C1, C2. For leaf nodes A1, C1, C2 that include a single entity, the bounding box of the leaf node is simply the bounding box of the individual entity of the node. For leaf nodes A2, B1, B2, B3 that include multiple entities, the bounding box of the leaf node is a minimum sized box that encloses all the bounding boxes of the individual entities included in the leaf node. At a next-higher level, the R-tree includes internal nodes A, B, C. The bounding box of each internal node A, B, C encloses the bounding boxes of a group of leaf nodes. At the very highest level of the R-tree is a root node ROOT. The bounding box of the root node ROOT encloses the bounding boxes of the internal nodes A, B, C.

Figure 8A:
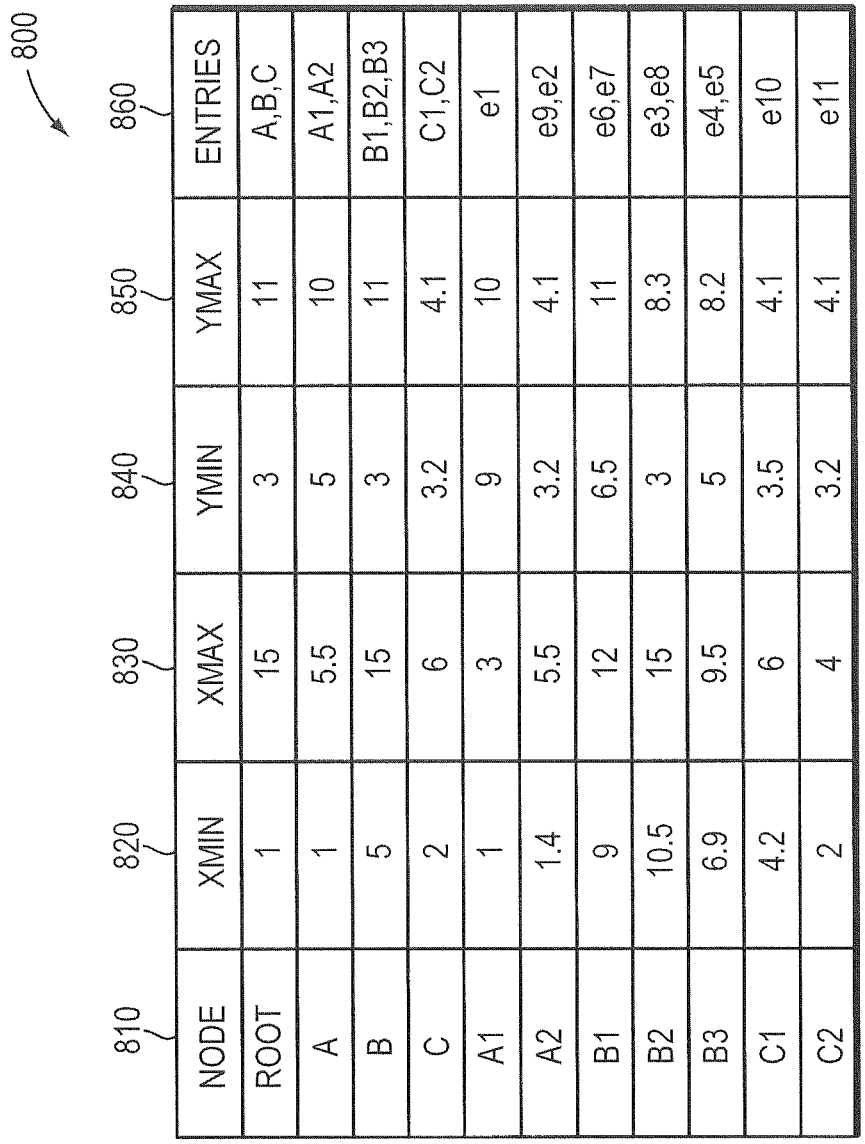
FIG. 8A is a tabular representation of the example R-tree graphically shown in FIG. 7.

FIG. 8A is a tabular representation 800 of the example R-tree graphically shown in FIG. 7. A column 810 indicates nodes of the R-Tree. Additional columns 820-850 indicate the minimum x-axis coordinate, the maximum x-axis coordinate, the minimum y-axis coordinate, and the maximum y-axis coordinate for each node, which collectively define its bounding box. A final column 860 indicates the other nodes or entities contained within each node.

Figure 8B:
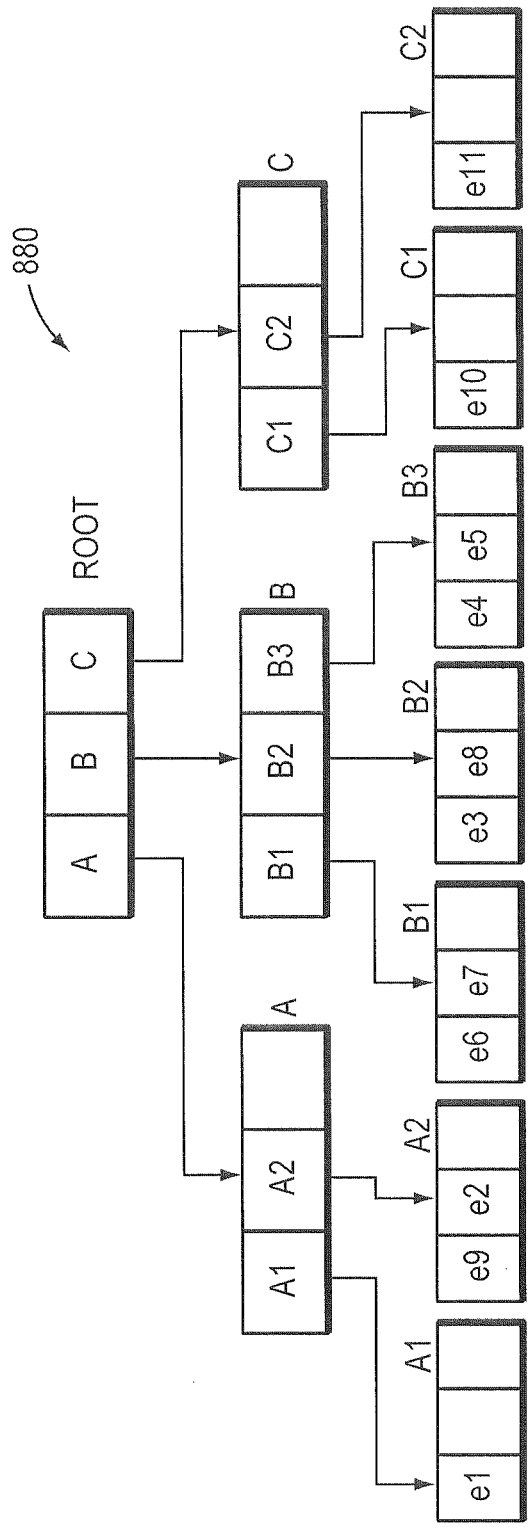
FIG. 8B is a logical representation of the example R-tree graphically shown in FIG. 7.

FIG. 8B is a logical representation 880 of the example R-tree graphically shown in FIG. 7. As can be seen in the logical representation, the root, internal and leaf nodes form a balanced tree structure.

FIG. 9 is a tabular representation 900 of example operational steps performed, using the example data and R-tree described in FIGS. 4-8B. A column 910 indicates the step. Another column 920 indicates the target (e.g., node or entity) in the corresponding step. An additional column 930 indicates the outcome of the spatial testing function 244 ("SpatialScore") on each target. Still another column 940 indicates the outcome of application of the entity filtering criteria ("Prop1<4") on each entity which can potential contribute. Finally, a column 950 indicates the current range union result computed by the aggregate function ("EntityAccept") 246.

At step 1 of the example, the root node ROOT is subject to the spatial testing function and accepted. Consequently, internal nodes A, B, C are subject to the spatial testing function in steps 2, 8 and 16. At step 2, internal node A is subject to the spatial testing function and accepted. The current range union result may be NULL at this stage, and therefore any bounding box may expand it. Consequently, leaf nodes A1 and A2 are subject to the spatial testing function 244 in steps 3 and 4. At step 3, leaf node A1 is subject to the spatial testing function and similarly accepted. Consequently, entity e1 is considered in step 4. At step 4, entity e1 is subject to the spatial testing function 244 and accepted. The entity filtering criteria (Prop1<4) are then applied to entity e1. Entity e1 has a property value of 1 (Prop 1=1), which meets the criteria. Consequently, entity e1 is passed to the aggregate function. The current range union result becomes the bounding box of entity e1 ({1, 3, 9, 10}).

At step 5, leaf node A2 is subject to the spatial testing function and accepted. Consequently, entries 9 and 2 are subject to further considered in steps 6 and 7. At step 6, entity e9 is subject to the spatial testing function and accepted. The entity filtering criteria are applied to entity e9, which meets the criteria. Consequently, entity e9 is passed to the aggregate function. The aggregate function performs a union of the current range union result ({1, 3, 9, 10}) with the bounding box of entity e9 ({3.8, 5.5, 5, 7}), and updates the current range union result to have a new value ({1, 5.5, 5, 10}. At step 7, entity e2 is subject to the spatial testing function and rejected, since entity e2 cannot potentially expand the current range union result. The bounding box of entity e2 ({1.4, 3, 5, 6.5}) is completely contained within the current range union result ({1, 5.5, 5, 10}). Consequently, entity e2 is excluded from further consideration with no need to evaluate the entity filtering criteria against e2.

At step 8, the internal node B is subject to the spatial testing function and accepted. Consequently, leaf nodes B1, B2 and B3 are subject to the spatial testing function in steps 9, 12 and 15. At step 9, leaf node B1 is subject to the spatial testing function and accepted. Consequently, entities 6 and 7 are considered in steps 10 and 11. At step 10, entity e6 is subject to the spatial testing function and accepted. The entity filtering criteria (Prop 1<4) are then applied to entity e6. Entity e6 has a property value of 7 (Prop 1=7), which fails the criteria. Consequently, entity e6 is rejected. At step 11, entity e7 is subject to the spatial testing function and accepted. The entity filtering criteria are applied to entity e7, which satisfy the criteria. Consequently, entity e7 is passed to the aggregate function. The aggregate function performs a union of the current range union result (1, 5.5, 5, 11}) with the bounding box of entity e7 ({9, 10, 9.5, 11}), and updates the current range union result to have a new value ({1, 10, 5, 11}).

At step 12, leaf node B2 is subject to the spatial testing function and accepted. Consequently, entities 3 and 8 are considered in steps 13 and 14. At step 13, entity e3 is subject to the spatial testing function and accepted. The entity filtering criteria are applied to entity e3, which satisfy the criteria. Consequently, entity e3 is passed to the aggregate function. The aggregate function performs a union of the current range union result ({1, 10, 5, 11}) with the bounding box of entity e3 ({10.5, 11.8, 3, 4}), and updates the current range union result to have a new value ({1, 11, 8.3, 11}). At step 14, the entity filtering criteria are applied to entity e8. Entity e8 has a property value of 6 (Prop 1=6), which fails the criteria. Consequently, entity e8 is rejected.

At step 15, the leaf node B3 is subject to the spatial testing function and rejected since its bounding box ({6.9, 9.5, 5, 8.2}) is already fully contained within the current range union result ({1, 11, 8.3, 11}). Accordingly leaf node B3, is excluded from further consideration, and entity e4 and entity e5 of leaf node B3 are not considered.

At step 16, the internal node C is subject to the spatial testing function and rejected since it cannot expand the current range union result. Its bounding box ({2, 6, 3, 2, 4.1}) is already fully contained within the current range union result ({1, 11, 8.3, 11}). Accordingly, internal node C, and internal nodes C1 and C2, are excluded from further consideration, and therefore entities e10 and e11 are not considered. At this point, since all the internal and leaf nodes of the R-Tree have been tested or excluded from further consideration, the current range union result ({1, 11, 8.3, 11}) is returned as the final range union result. To come to the final range union result for this example data, the entity filtering criteria are applied only 6 times, while there are 11 entities. As should be apparent, this represents an efficiency gain over a typical "brute-force" approach, where every entity would be compared against the entity filtering criteria.

In summary, the present disclosure describes embodiments for efficiently computing a union of the bounding boxes (i.e., a range union) of a set of entities in a relational database indexed by a spatial index, filtered according to some entity filtering criteria. It should be understood that various adaptations and modifications may be readily made to the embodiments, to suit implementation constraints.

While it is discussed above that the client application 140, relational database system 145 and relational database 148 are all resident on a single electronic device 100, it should be understood that in alternative embodiments such applications and data, and/or portions of such applications and data, may be distributed across a number of electronic devices, according to a number of different distributed and collaborative computing architectures, including client-server architectures, peer-to-peer architectures, client-queue-client architectures, and the like.

Further, it should be understood that at least some of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors. Accordingly, it should be understood that the above descriptions are meant to be taken only by way of example.

What is claimed is:

1. A method for computing a union of bounding boxes of entities in a relational database indexed by a spatial index, filtered according to an entity filtering criteria, the method comprising:
receiving, by a relational database system executing on an electronic device, a query statement requesting the union of the bounding boxes of entities in the relational database filtered according to the entity filtering criteria;
for each of a set of targets to be considered in the spatial index, testing a bounding box of the target against a current range union result, and
if the bounding box of the target subject to test is completely contained in the current range union result, excluding the target subject to test from further consideration and when the target subject to test is an internal node excluding any lower level nodes or entities in the spatial index pointed to from the internal node from further consideration, and
if the bounding box of the target subject to test is not completely contained in the current range union result, when the target subject to test is an entity, determining if the entity meets the entity filtering criteria, and if so, computing a union of a bounding box of the entity and the current range union result, and storing the union as the current range union result; and
when each of the targets to be considered in the spatial index has been subject to test or excluded, returning the current range union result as a final range union result.

2. The method of claim 1, further comprising:
creating a backchannel object that maintains the current range union result.

3. The method of claim 2, wherein the backchannel object also maintains an indication of a most recent bounding box tested.

4. The method of claim 1, wherein the testing is performed by a spatial testing function, the spatial testing function being an extension function implemented by the relational database system executing on the electronic device.

5. The method of claim 1, wherein the returning is performed by an aggregate function, the aggregate function being an extension function implemented by the relational database system executing on the electronic device.

6. The method of claim 1, wherein the relational database system is a SQL relational database system.

7. The method of claim 6, wherein the query statement is a SQL SELECT statement, and the entity filtering criteria are WHERE criteria.

8. The method of claim 1, wherein the spatial index is an R-tree.

9. The method of claim 1, wherein the relational database stores three-dimensional (3-D) spatial data.

10. The method of claim 1, wherein the relational database system is a SQL embedded database system of a client application executing on the electronic device.

11. The method of claim 10, wherein the client application is a computer aided design (CAD) viewing application, and each entity corresponds to an element of a model used by the CAD viewing application.

12. The method of claim 1, wherein the electronic device is a tablet computer.

13. A non-transitory computer-readable medium containing executable instructions, the executable instructions, when executed by one or more processors, operable to:
process a query statement requesting a union of bounding boxes of entities in a relational database that includes spatial data filtered according to an entity filtering criteria, wherein the entities in the relational database are indexed by a spatial index;
for each of a set of targets to be considered in the spatial index, test a bounding box of the target against a current range union result, and
if the bounding box of the target subject to test is completely contained in the current range union result, exclude the target subject to test from further consideration and when the target subject to test is an internal node exclude any lower level nodes or entities in the spatial index pointed to from the internal node from further consideration, and
if the bounding box of the target subject to test is not completely contained in the current range union result, when the target subject to test is an entity, determine if the entity meets the entity filtering criteria, and if so, compute a union of a bounding box of the entity and the current range union result, and store the union as the current range union result; and
when each of the targets to be considered in the spatial index has been subject to test or excluded, return the current range union result as a final range union result.

14. The non-transitory computer-readable medium of claim 13, wherein the executable instructions, when executed by the one or more processors, are further operable to:
create a backchannel object that maintains the current range union result.

15. The non-transitory computer-readable medium of claim 14, wherein the backchannel object also maintains an indication of a most recent bounding box tested.

16. The non-transitory computer-readable medium of claim 13, wherein the executable instructions comprise a spatial testing function, the spatial testing function being an extension function that tests of the bounding box of the target against the current range union result.

17. The non-transitory computer-readable medium of claim 13, wherein the executable instructions comprise an aggregate function, the aggregate function being an extension function that returns the final range union result.

18. An electronic device configured to compute a union of bounding boxes of entities in a relational database indexed by a spatial index, filtered according to an entity filtering criteria, the electronic device comprising:
a display screen;
a processor configured to execute executable instructions; and
a memory configured to store executable instructions and data, the executable instructions and data including:
a relational database having entities indexed by the spatial index, a client application configured to request a union of bounding boxes of entities in the relational database filtered according to an entity filtering criteria, and a relational database system configured to, for each of a set of targets to be considered in the spatial index, test a bounding box of the target against a current range union result, and if the bounding box of the target subject to test is completely contained in the current range union result, exclude the target subject to test from further consideration and when the target subject to test is an internal node exclude any lower level nodes or entities in the spatial index pointed to from the internal node from further consideration, and if the bounding box of the target subject to test is not completely contained in the current range union result, when the target subject to test is an entity, determine if the entity meets the entity filtering criteria, and if so, compute a union of a bounding box of the entity and the current range union result, and store the union as the current range union result, when each of the targets to be considered in the spatial index has been subject to test or excluded, return the current range union result as a final range union result.

19. The electronic device of claim 18, wherein the electronic device is a tablet computer.

* * * * *